United States Patent
Rudolf

(10) Patent No.: US 7,280,829 B2
(45) Date of Patent: *Oct. 9, 2007

(54) METHOD AND SYSTEM FOR IMPROVED BEACON ACQUISITION PERFORMANCE WITH TIME SLOT AND ANTENNA SECTOR REUSE

(75) Inventor: Marian Rudolf, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 46 days.

This patent is subject to a terminal disclaimer.

(21) Appl. No.: 11/118,872

(22) Filed: Apr. 29, 2005

(65) Prior Publication Data

US 2005/0192060 A1 Sep. 1, 2005

Related U.S. Application Data

(63) Continuation of application No. 10/330,750, filed on Dec. 27, 2002, now Pat. No. 6,928,283.

(60) Provisional application No. 60/412,273, filed on Sep. 20, 2002.

(51) Int. Cl.
*H04Q 7/20* (2006.01)
*H04B 7/00* (2006.01)

(52) U.S. Cl. ............... 455/434; 455/515; 455/452.2

(58) Field of Classification Search .......... 455/434, 455/436, 435.2, 440, 443, 422.1, 561, 562.1, 455/91, 115.1, 502, 67.13, 63.1, 450, 452.2
See application file for complete search history.

(56) References Cited

U.S. PATENT DOCUMENTS 5,257,398 A 10/1993 Schaeffer
5,809,421 A 9/1998 Manssen et al.
5,815,801 A 9/1998 Hamalainen et al.
5,900,838 A 5/1999 Khan et al.
5,930,366 A 7/1999 Jamal et al.
6,028,853 A 2/2000 Haartsen
6,108,545 A 8/2000 Keshavachar
6,233,247 B1 5/2001 Alami et al.
6,266,529 B1 7/2001 Chheda
6,351,463 B1 2/2002 DeSantis
6,470,177 B1* 10/2002 Andersson et al. ........... 455/91
6,522,881 B1 2/2003 Feder et al.
6,539,236 B2 3/2003 Hakkinen et al.
6,639,908 B1 10/2003 Silventoinen et al.
6,907,228 B1* 6/2005 Lohtia et al. ................. 455/62

(Continued)

FOREIGN PATENT DOCUMENTS

EP 0 444 485 9/1991

(Continued)

*Primary Examiner*—Sonny Trinh
(74) *Attorney, Agent, or Firm*—Volpe and Koenig, P.C.

(57) ABSTRACT

A wireless multi-cell communication system, such as a time division duplex (TDD) system, includes at least one wireless transmit/receive unit (WTRU) and a plurality of base stations which broadcast beacon signals into a plurality of sectors of a cell of the system. Beacon channel acquisition performance is enhanced by reducing beacon channel mutual interference. Each of the base stations broadcast a beacon signal into at least one of the cell sectors in a first time slot at least another one of the cell sectors in a second time slot different from the first time slot. The WTRU determines, at a particular position, which one of the beacon signals has the best signal quality, acquires the one beacon signal and establishes communications via the base station that generated the one beacon signal having the best signal quality.

22 Claims, 2 Drawing Sheets

U.S. PATENT DOCUMENTS

| | | |
|---|---|---|
| 6,928,283 B2 | 8/2005 | Rudolf |
| 6,985,498 B2 * | 1/2006 | Laroia et al. ............... 370/478 |
| 6,993,333 B2 * | 1/2006 | Laroia et al. ............... 455/436 |
| 7,047,009 B2 * | 5/2006 | Laroia et al. ............... 455/437 |
| 7,092,353 B2 * | 8/2006 | Laroia et al. ............... 370/210 |
| 2005/0075125 A1 * | 4/2005 | Bada et al. ................. 455/525 |

FOREIGN PATENT DOCUMENTS

| | | |
|---|---|---|
| EP | 0 637 180 | 2/1995 |
| WO | 98/19485 | 5/1998 |
| WO | 9819485 | 5/1998 |
| WO | 01/39397 | 5/2001 |
| WO | 01/39537 | 5/2001 |
| WO | WO 0191497 A1 | 5/2001 |
| WO | 01/91497 | 11/2001 |
| WO | WO 01399397 A1 | 11/2001 |
| WO | 02/078371 | 10/2002 |

* cited by examiner

METHOD AND SYSTEM FOR IMPROVED BEACON ACQUISITION PERFORMANCE WITH TIME SLOT AND ANTENNA SECTOR REUSE

CROSS REFERENCE TO RELATED APPLICATIONS

This application is a continuation of U.S. patent application Ser. No. 10/330,750 filed Dec. 27, 2002 now U.S. Pat. No. 6,928,283, which claims the benefit of U.S. Provisional Patent Application No. 60/412,273 filed Sep. 20, 2002, which are incorporated by reference as if fully set forth.

BACKGROUND OF THE INVENTION

The ability of a mobile or fixed wireless transmit/receive unit (WTRU) to acquire beacon channels in a fast and reliable manner is a key functionality for a Third Generation (3G) Time Division Duplex (TDD) system. Beacon channels, also known as broadcast control channels (BCHs), transmit in a predefined slot within a particular frame of a multi-frame TDD system.

A beacon channel is always a BCH, but other channels such as the paging indicator channel (PICH) or a paging channel (PCH) can also be used as beacon channels. However, an important characteristic of a beacon channel is that it must be transmitted at a fixed (high) reference power level such that the beacon can be reliably received everywhere in the cell. This allows a WTRU to determine the pathloss estimate from the known beacon channel. In the favored deployment of a TDD system, an unlimited number of base stations (BSs) may transmit their beacon signals in the same time slot, allowing all the WTRUs in the coverage area to measure all the beacons simultaneously. The WTRUs can then compare the power received from each of the BSs in the coverage area and choose to connect to the BS with the highest quality signal.

The WTRU acquires the beacon for system access information or to find other WTRUs for eventual cell handover or cell re-selection. The advantage of having all the neighboring BS beacons in the same timeslot also leads to a disadvantage in the form of interference from all the high powered signals in the same time slot.

A beacon channel can be further defined as a special physical channel that is sent at a fixed high reference power and uses a special reserved orthogonal variable spreading factor (OVSF) code, which is sent at least once per frame. A time slot (TS) that contains a beacon channel is called a beacon TS.

There are two common deployment scenarios for beacon time slots in TDD systems. In the first scenario, only a single time slot is allocated as the beacon TS of a cell. The single beacon TS containing the BCH is always found at a specific time slot location TS(k) of the frame. In the second scenario, two time slots are allocated as the beacon TSs of a cell. The BCH beacon information is sent at location TS(k) of the frame and the second beacon TS of the frame is located at TS(k+8). The second beam TS is known as the secondary beacon and it may contain other downlink channel information. The second scenario represents the predominant deployment of a TDD system today.

TDD cells which operate in close geographical areas and on the same frequencies need resource coordination and time synchronization in order to achieve maximum system capacity and efficiency. The deployment of the beacon TSs of TDD cells uses a scheme where the beacon channels of all neighboring cells are sent in the same time slot, thus requiring time alignment. The major benefit of time-aligned beacons is that it allows WTRUs to simultaneously measure their neighboring cell BS and the current serving cell BS. The WTRU may discover another BS with a better signal level and switch to that BS, thereby allowing the WTRU to reduce its transmitting power and preserve battery life. However, if the coverage area has many BSs in close proximity, there is a strong possibility that the time-aligned beacon TSs will lead to extremely degraded BCH beacon acquisition performance for WTRUs.

To study the acquisition time of the BCH beacon, a simple geometric arrangement based upon path-loss shows that a WTRU at a cell's border, (equally. distant between two neighboring BSs), experiences an intra-cell interference (Ior) to inter-cell interference (Ioc) ratio (Ior/Ioc) of 0 dB. The intra-cell interference (Ior) is the total received signal power in a time slot from the BS in which the WTRU is communicating. The inter-cell interference (Ioc) is the sum of the total received signal power in the same TS from all the neighboring BSs. Intra-cell interference (Ior) is therefore the "useful" energy, or the signal from the BS with which the WTRU is communicating. Inter-cell interference is the interference caused by all the undesired signal energy from all the other BSs received by the WTRU, and is therefore detrimental to the decoding of the "useful" signal.

This Ior/Ioc ratio is an important parameter for the performance of a multiuser detector (MUD). The analogous ratio which is found in the more classic signal detectors, such as RAKE receivers in frequency division Duplex (FDD) is Ec/Io, where "Ec" is the energy per chip of the desired spreading code and Io is the sum of the energies of all other spreading codes which the WTRU can receive, but does not need to decode. As the geometric path-loss situation is extended to more than just the two closest neighbors, the Ior/Ioc ratio will continue to decrease and approach −1.5 dB.

Shadowing and fading will make the communications worse and more sporadic. In fading environments, it is anticipated that an Ior/Ioc in the range of at least −1 to 0 dB or higher is needed in order to decode the BCH properly with reasonable acquisition time. Analysis has shown that for a time-aligned BCH TS communication system, approximately 25% of WTRUs at cell borders and 15% within all cell areas will experience an Ior/Ioc <−1 dB. This results in a very degraded BCH beacon detection which leads to detrimental effects on the user's perception of quality-of-service. As the Ior/Ioc value decreases, the BCH beacon acquisition is compromised and WTRU synchronization under the worst-case circumstances would be impossible for a significant part of the deployment area.

It is therefore desirable to provide a novel beacon TS utilization approach to obviate the disadvantages discussed above.

SUMMARY

The present invention improves acquisition performance of beacon channels using time-staggered beacon time slots. The present invention may be incorporated in a wireless multi-cell communication system, such as a TDD system, which includes at least one WTRU and a plurality of base stations which broadcast beacon signals into a plurality of sectors of a cell of the system. Beacon channel acquisition performance is enhanced by reducing beacon channel mutual interference. Each of the base stations broadcast a beacon signal into at least one of the cell sectors in a first time slot at least another one of the cell sectors in a second time slot different from the first time slot. The WTRU determines, at a particular position, which one of the beacon signals has the best signal quality, acquires the one beacon signal and establishes communications via the base station that generated the one beacon signal having the best signal quality.

BRIEF DESCRIPTION OF THE DRAWINGS

A more detailed understanding of the invention may be had from the following description of preferred embodiments, given by way of example and to be understood in conjunction with the accompanying drawing wherein.

DETAILED DESCRIPTION OF THE PREFERRED EMBODIMENTS

The present invention employs an interference avoidance strategy which can be used to improve the beacon channel acquisition performance. The present invention can be implemented in a TDD system, or any other system whose cells can tolerate time staggering of the beacon channels. It can be deployed in an area using sectored cell sites or non-sectored cell sites as well. In general, it is the characteristic of the cells and their sectors, irrespective how the operator places its base stations to provide service. Although the figures herein only show sectored cells, it is also possible that one base station corresponds to one cell or sector when placed approximately in the middle of the cell or sector.

Figure 1:
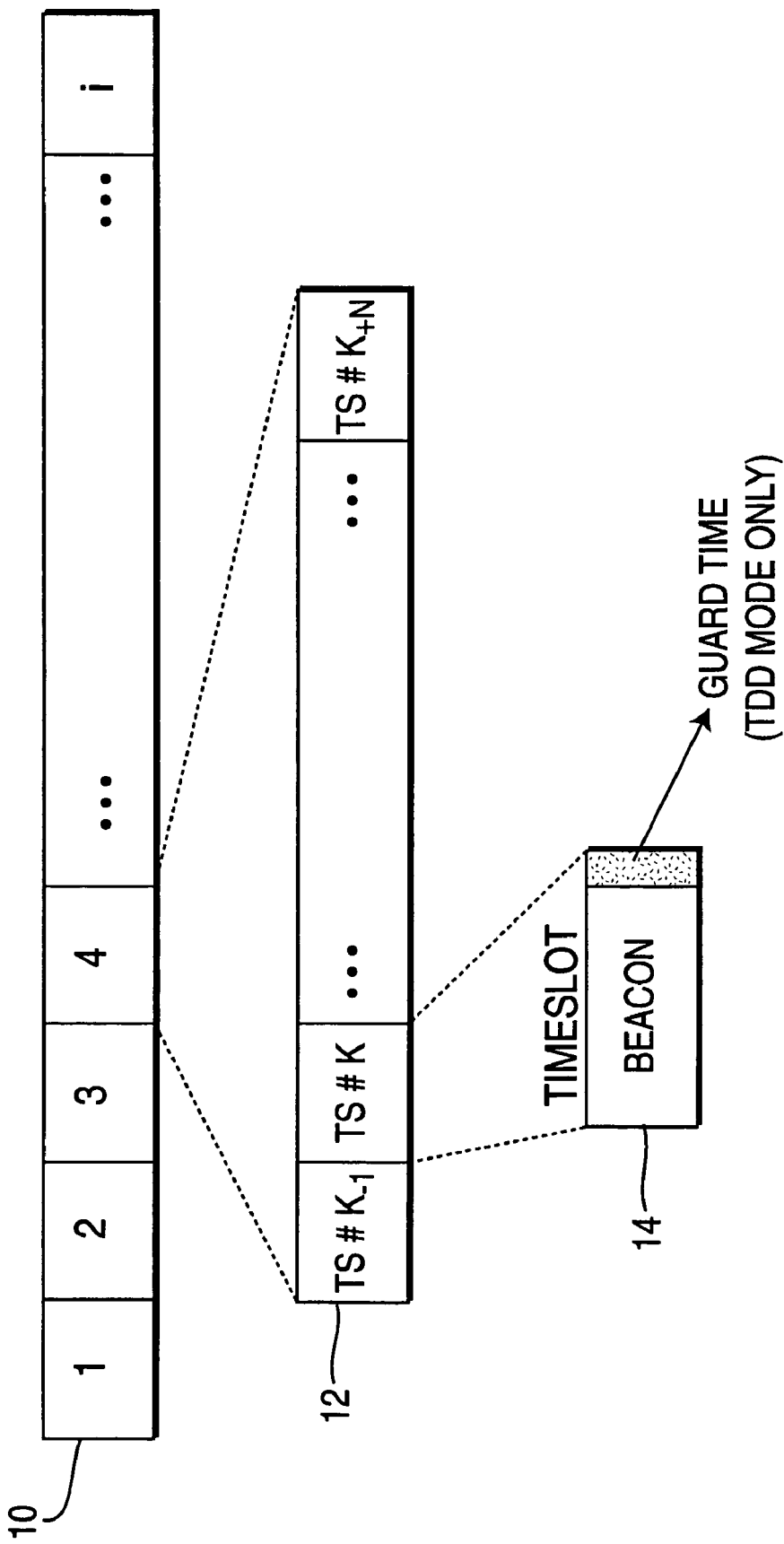
FIG. 1 is an illustration of an example showing a typical time slot of the prior art with one allocated beacon TS.

FIG. 1 illustrates a typical beacon TS 14 of the prior art. The beacon TS 14 is part of a frame 12. In wideband TDD, a frame comprises 15 timeslots and has a 10 ms length, but in other systems a different type of frame structure may be employed. For example, in narrowband TDD a group of 7 timeslots with an overall of 5 ms length is called a sub-frame. Two sub-frames make up a radio frame 10 having a length of 10 ms, which comprises a frame of the multi-frame structure of the radio frame 10.

In the present invention, the beacon TSs are allocated to sectorized cells such that their mutual interference is minimized according to certain reuse patterns. The optimum reuse pattern depends on the number of sectored or normal cell sites, the number of beacon TSs available and the characteristics of the radio environment. Although the following description refers to a TDD system as an example, the TDD system has been selected for convenience. Accordingly, the present invention should not be construed as being limited to a TDD system.

The time staggered approach could comprise a simple approach, wherein the prior art allocated the beacons of all cells or sectors into TS(k) and TS(k+n) in every frame. The present invention proposes that a first group of these cells or sectors having their Beacons in TS(k) and TS(k+n) in every frame and a second group of these cells or sectors having their beacons in TS(m) and TS(m+p) in every frame or any extension of this timeslot reuse pattern principle. The UTRA TDD standard does not fix the beacon to be in any particular timeslot (unlike GSM). It states that the beacon channel (BCH) must be at some TS(k), where k ranges from 1 to 7. When there is a second beacon TS in the frame, it must be at TS(k+8).

Figure 2:
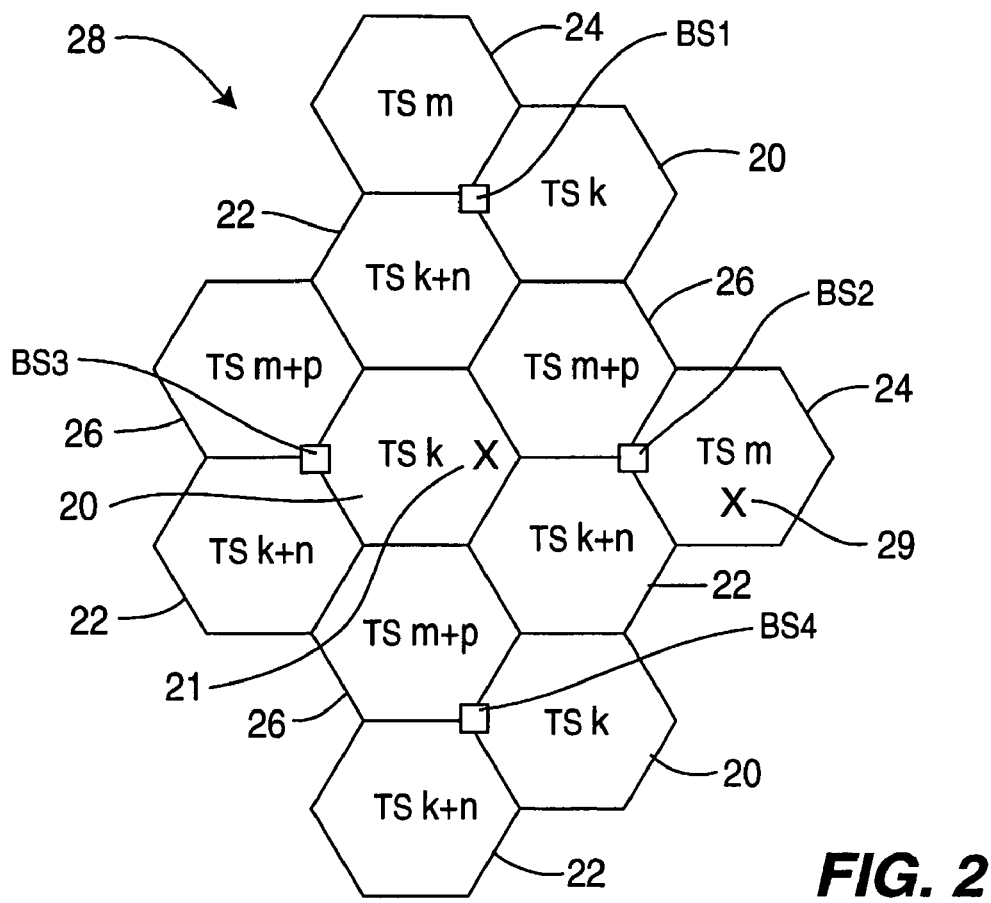
FIG. 2 is an illustration of an example showing cell sectors with the minimum of two allowed beacon TSs.

A first embodiment of the present invention is shown in FIG. 2, which utilizes a beacon timeslot reuse factor of two without spatial dimension cell sectoring. The coverage area 28 has four base stations, BS1, BS2, BS3 and BS4. Each base station BS1-BS4 is assigned a different staggered time slot for its beacon transmission into one of three cells. The first group of BSs transmit their beacons into cells 20 and 22 at time slots TS(k) and TS(k+n) respectively. The second group of BSs transmits their beacons into cells 24 and 26, at timeslots TS(m) and TS(m+p), respectively. TS(k) represents a time slot at time k and TS (k+n) represents another time slot that is offset from TS(k) by n time slots. The same methodology follows through for cells TS(m) and TS(m+p).

A WTRU in position 29 becomes activated while it is located in the cell 24 of BS2, which is in the coverage area 28. In this deployment scenario, the WTRU can receive one of four possible time slot beacons, TS(k), TS(k+n), TS(m) or TS(m+p), each representing a possible cell location. For this example and simplicity, the received beacon with the best signal quality is the one being transmitted by BS2 into cell 24 with a beacon time slot of TS(m). The WTRU in position 29 would acquire this BCH beacon and establish its communication via BS2. As the WRTU moves throughout the coverage area 28, it can monitor other beacons in the different time slots and make a determination whether it should hop to another BS based on the beacon channel signals.

If the WTRU were to move into position 21 and the surrounding base stations BS1-BS4 were all transmitting their BCH beacon in the same time slot, the WTRU would find it difficult to acquire a BCH beacon due to the aforementioned Ior/Ioc ratio problems. Therefore, a reduction of the mutual interference of the beacon channels of neighboring cells will improve the average experienced Ior/Ioc for mobiles in the coverage area and therefore improve BCH acquisition time.

Figure 3:
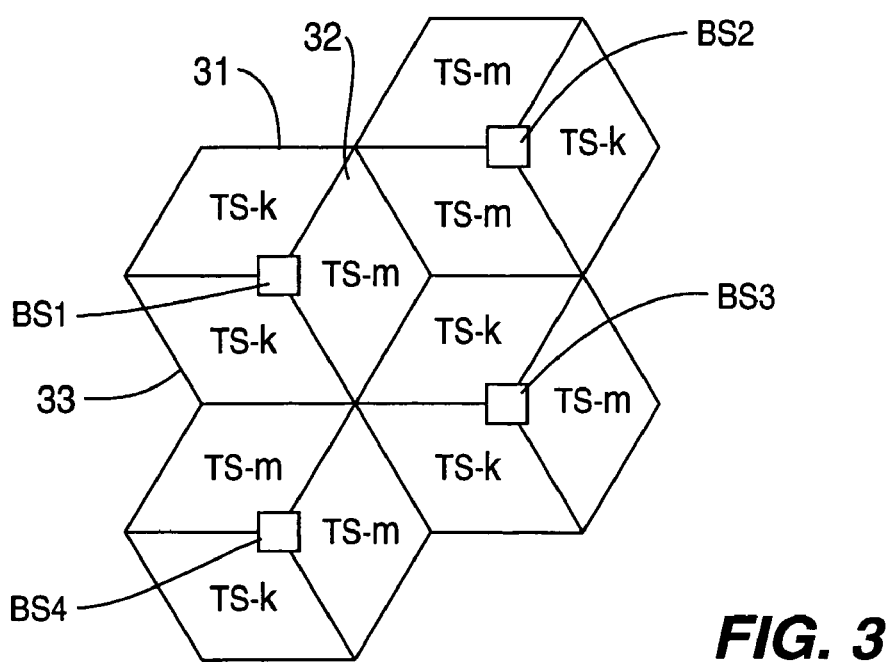
FIG. 3 is an illustration of an example showing three sectored cells per cell site.

In an alternative embodiment, a plurality of cells using cell sectorization or spatial dimensioning with three sectors per cell and antennas with a reuse of two is shown in FIG. 3. Each base station BS1-BS4 broadcast beacon signals into three sectors. The three sectors are comprised of either two TS(k)s sectors and one TS(m) sector or one TS(k) sector and two TS(m)s sectors. When BS1 transmits the BCH beacon into sectors 31 or 33, the BS1 broadcasts the beacon at time slot k. Alternatively, when BS1 is transmitting into sector 32, the BS1 transmits the beacon in time slot m.

Furthermore, besides the standard macro-cell sites, there are additional embodiments for special cell sectorization for which the inventive method is applicable. For example, a pico-BTS cell for a large gathering of people in a dense place, such as a sporting event or a convention could have sectors by rows of seats in the auditorium. A micro-BTS cell may cover a street with two different sectors, one representing a north side of the street and the other sector representing the south side.

The present invention provides a very simple, yet effective interference avoidance strategy for beacon TS deployment in systems such as a UTRA-TDD system which can improve beacon acquisition time by means of radio network planning. Applying the present invention with antenna sector reuse cells enables UTRA-TDD system designers in dense urban pedestrian WTRU environments the ability to create systems with an acceptable user system acquisition perception as well as pragmatic use. This invention is fully compliant with the UTRA UMTS standards, especially since mobiles are required to be able to measure neighboring cells on any time slot. It should be noted that beacon TS allocation to cells in the present invention and method can still be changed during system operation and can be made especially effective when sectored cell sites are available.

The present invention described above, is not intended to replace the time-aligned beacon TS approach which has advantages in terms of WTRU battery life and system capacity. However, for deployment scenarios where a time-aligned beacon time slot deployment leads to unacceptable beacon acquisition performance for a significant percentage of WTRUs in the coverage area, the present invention represents a valuable and easy-to-implement methodology for radio resource management (RRM).

Although particular processing functions have been described as being performed by particular components, it should be understood that performance of processing functions may be distributed among network components as desired.

Although the present invention has been described in detail, it is to be understood that the invention is not limited thereto, and that various changes can be made therein without departing from the spirit and scope of the invention, which is defined by the attached claims.

What is claimed is:

1. In a wireless multi-cell communication system including a plurality of base stations which broadcast beacon signals into a plurality of sectors of a cell of the system, a method of enhancing beacon channel acquisition performance by reducing beacon channel mutual interference, the method comprising:
   (a) each of the base stations broadcasting a beacon signal into at least one of the cell sectors in a first time slot; and
   (b) each of the base stations broadcasting a beacon signal into at least another one of the cell sectors in a second time slot different from the first time slot.

2. The method of claim 1 further comprising:
   (c) determining, at a particular position, which one of the beacon signals has the best signal quality; and
   (d) acquiring the one beacon signal and establishing communications via the base station that generated the one beacon signal having the best signal quality.

3. The method of claim 2 wherein steps (c) and (d) are performed by at least one wireless transmit/receive unit (WTRU) located at the particular position.

4. The method of claim 1 wherein the wireless multi-cell communication system is a time division duplex (TDD) system.

5. The method of claim 1 wherein each cell has at least three cell sectors, and each base station broadcasts a beacon signal into two of the at least three cell sectors in a first time slot, and broadcasts a beacon signal into the remaining cell sector(s) in a second time slot different from the first time slot.

6. The method of claim 1 wherein each of the time slots is offset from each of the other time slots by a predetermined number of time slots.

7. A wireless multi-cell communication system for enhancing beacon channel acquisition performance by reducing beacon channel mutual interference, the system comprising:
   (a) at least one wireless transmit/receive unit (WTRU); and
   (b) a plurality of base stations for broadcasting beacon signals into a plurality of sectors of a cell of the system, wherein each of the base stations comprises at least one transmitter for broadcasting a beacon signal into at least one of the cell sectors in a first time slot, and for broadcasting a beacon signal into at least another one of the cell sectors in a second time slot different from the first time slot.

8. The system of claim 7 wherein the at least one WTRU determines, at a particular position, which one of the beacon signals has the best signal quality, wherein the WTRU acquires the one beacon signal and establishes communications via the base station that generated the one beacon signal having the best signal quality.

9. The system of claim 7 wherein the wireless multi-cell communication system is a time division duplex (TDD) system.

10. The system of claim 7 wherein each cell has at least three cell sectors, and each base station broadcasts a beacon signal into two of the at least three cell sectors in a first time slot, and broadcasts a beacon signal into the remaining cell sector(s) in a second time slot different from the first time slot.

11. The system of claim 7 wherein each of the time slots is offset from each of the other time slots by a predetermined number of time slots.

12. In a wireless multi-cell communication system including a plurality of base stations, a method of enhancing beacon channel acquisition performance by reducing beacon channel mutual interference, the method comprising:
    (a) a first one of the base stations broadcasting beacon signals into a first cell of the system in a first time slot;
    (b) the first one of the base stations broadcasting beacon signals into a second cell of the system in a second time slot different from the first time slot.

13. The method of claim 12 further comprising:
    (c) a second one of the base stations broadcasting beacon signals into a third cell of the system in a third time slot; and
    (d) the second one of the base stations broadcasting beacon signals into a fourth cell of the system in a fourth time slot different from the third time slot.

14. The method of claim 13 further comprising:
    (e) determining, at a particular position, which one of the beacon signals has the best signal quality; and
    (f) acquiring the one beacon signal and establishing communications via the base station that generated the one beacon signal having the best signal quality.

15. The method of claim 14 wherein steps (e) and (f) are performed by at least one wireless transmit/receive unit (WTRU) located at the particular position.

16. The method of claim 13 wherein each of the time slots is offset from each of the other time slots by a predetermined number of time slots.

17. The method of claim 12 wherein the wireless multi-cell communication system is a time division duplex (TDD) system.

18. A wireless multi-cell communication system for enhancing beacon channel acquisition performance by reducing beacon channel mutual interference, the system comprising:
    (a) at least one wireless transmit/receive unit (WTRU); and
    (b) a first base station which broadcasts beacon signals into a first cell of the system in a first time slot and into a second cell of the system in a second time slot different from the first time slot.

19. The system of claim 18 further comprising:
    (c) a second base station which broadcasts beacon signals into a third cell of the system in a third time slot and into a fourth cell of the system in a fourth time slot different from the third time slot.

20. The system of claim 19 wherein the at least one WTRU determines, at a particular position, which one of the beacon signals has the best signal quality, wherein the WTRU acquires the one beacon signal and establishes communications via the base station that generated the one beacon signal having the best signal quality.

21. The system of claim 19 wherein each of the time slots is offset from each of the other time slots by a predetermined number of time slots.

22. The system of claim 18 wherein the wireless multi-cell communication system is a time division duplex (TDD) system.

* * * * *

UNITED STATES PATENT AND TRADEMARK OFFICE
CERTIFICATE OF CORRECTION

PATENT NO. : 7,280,829 B2
APPLICATION NO. : 11/118872
DATED : October 9, 2007
INVENTOR(S) : Marian Rudolf Page 1 of 1

It is certified that error appears in the above-identified patent and that said Letters Patent is hereby corrected as shown below:

On The Title Page Item -57-, ABSTRACT, line 7, after the word "stations", delete "broadcast" and insert therefor --broadcasts--.

On The Title Page Item -57-, ABSTRACT, line 9, after the word "slot", insert --and to--.

At column 2, line 65, after the word "stations", delete "broadcast" and insert therefor --broadcasts--.

At column 2, line 67, after the word "slot", insert --into--.

At column 4, line 40, before the word "beacon", delete "broadcast" and insert therefor --broadcasts--.

Signed and Sealed this

First Day of April, 2008

JON W. DUDAS
*Director of the United States Patent and Trademark Office*